United States Patent

Newland et al.

[11] Patent Number: 6,104,991
[45] Date of Patent: *Aug. 15, 2000

[54] SPEECH ENCODING AND DECODING SYSTEM WHICH MODIFIES ENCODING AND DECODING CHARACTERISTICS BASED ON AN AUDIO SIGNAL

[75] Inventors: Paul B. Newland, Middletown, N.J.; Albert V. Franceschi, Yardley, Pa.; Howard Lenn, Manalapan, N.J.

[73] Assignee: Lucent Technologies, Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 09/032,722

[22] Filed: Feb. 27, 1998

[51] Int. Cl.[7] ............................. G10L 11/00; G10L 19/14
[52] U.S. Cl. ......................... 704/212; 704/201; 704/222; 704/230
[58] Field of Search ................................. 704/211, 212, 704/213, 201, 200, 500, 501, 503, 504, 230, 219, 222

[56] References Cited

U.S. PATENT DOCUMENTS

| | | | |
|---|---|---|---|
| 3,594,509 | 7/1971 | Shimamura | 370/537 |
| 3,750,024 | 7/1973 | Dunn et al. | 704/212 |
| 4,825,451 | 4/1989 | Schwartz | 375/246 |
| 5,115,469 | 5/1992 | Taniguchi | 704/228 |
| 5,278,944 | 1/1994 | Sasaki et al. | 704/212 |
| 5,414,796 | 5/1995 | Jacobs et al. | 704/222 |
| 5,657,420 | 8/1997 | Jacobs et al. | 704/223 |

OTHER PUBLICATIONS

Doc. No. MC3418/D, Motorola Analog IC Device Data, "Continuously Variable Slope Delta Modulator/Demodulator", Motorola, Inc. 1996.

*Primary Examiner*—David R. Hudspeth
*Assistant Examiner*—Abul K. Azad
*Attorney, Agent, or Firm*—Ratner & Prestia

[57] ABSTRACT

The present invention relates to a speech encoder/decoder system employing digital transmission in which the encoding and decoding operations are complimentary, and these operations make use of sets of parameters which may be optimized for a speaker and for a particular digital radio link. A number of sets of parameters are determined experimentally, for example, by employing human sample groups in which perceived audio and transmission quality are tested. The encoder/decoder system then employs a group, or number, of sets of parameters serving all speakers rather than employing one fixed set of parameters. The particular set of parameters for a speaker in the encoder of a first transceiver is determined by a processor which receives values based on an analysis of the input audio signal, and then a parameter set identifier is sent within the digital signal for use by a decoder of a second transceiver. In addition, the processor of the first transceiver which receives a signal from the second transceiver may include circuitry which monitors the signal to noise ratio and bit error rate of the channel to provide a second criteria in addition to the received values based on the analysis of the input audio signal for choosing a particular set of parameters for the encoder.

14 Claims, 7 Drawing Sheets

SPEECH ENCODING AND DECODING SYSTEM WHICH MODIFIES ENCODING AND DECODING CHARACTERISTICS BASED ON AN AUDIO SIGNAL

FIELD OF THE INVENTION

The present invention relates generally to analog signal processing and, more particularly, to improvements to speech encoding and decoding systems for wireless or cordless telephones.

BACKGROUND OF THE INVENTION

The human voice may be represented as an analog signal, but digital transmission of any signal over great distance is preferred for several reasons. For example, low signal-to-noise ratios as seen by detectors caused by variations in distance between transceivers may be compensated for by introducing error correction and error detection in digital sequences. Further, multiplexing, switching and repeating hardware is more economical and easier to design in a digital transmission system. Consequently, in cordless and wireless applications between handset units and base units, speech encoding and decoding is used to convert a human analog voice signal to a digital format for transmission over the wireless interface.

The input to the speech encoder is usually in the form of a continuously variable voltage where that voltage changes value over time to represent the instantaneous sound pressure level at the microphone device. Within the speech encoder the digital signal generated by the encoder is used to construct an approximation of the applied speech signal within the encoder and the digital signal is generated in a manner to minimize the difference between the applied speech signal and the encoder's approximation of that signal.

The continuously variable slope delta modulator (CVSD) is a simple alternative to more complex conventional conversion techniques, such as adaptive differential pulse code modulation (ADPCM) encoding and decoding techniques, in systems requiring digital communication of analog signals. The CVSD analog to digital converter (A/D) is well suited to the requirements of digital communications and is an economically efficient means of digitizing analog inputs for transmission, and is described below to illustrate how encoding parameters may be generated. CVSD circuits are commercially available, for example, as an MC3418 CVSD Modulator/Demodulator integrated circuit from Motorola, Inc.

Figure 1A:
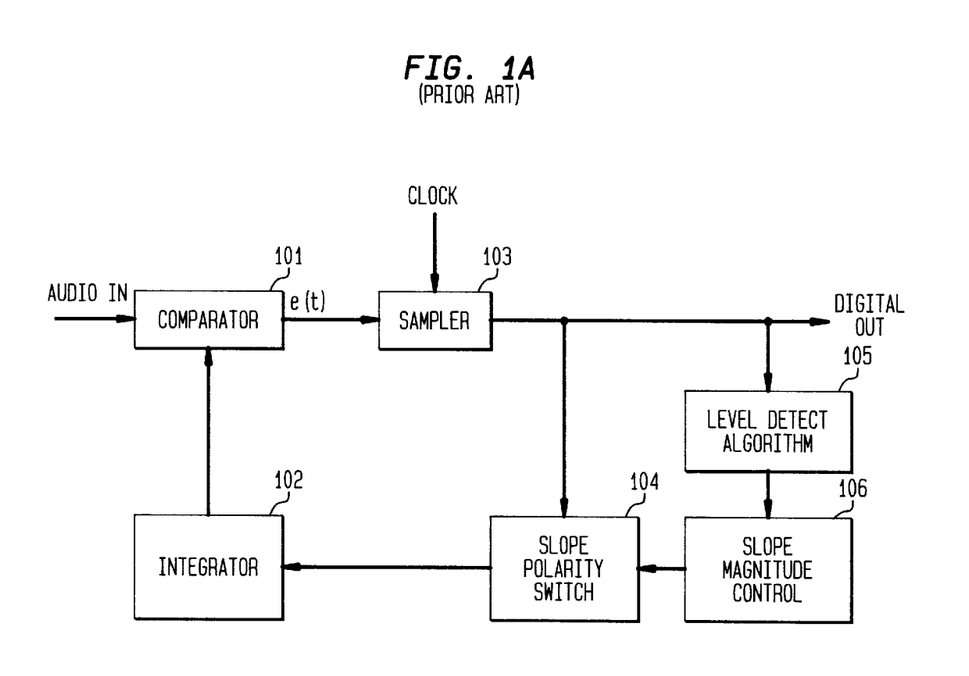
FIG. 1A is a block diagram of a CVSD encoder of the prior art.

A block diagram of a CVSD encoder of the prior art is shown in FIG. 1A. The innermost control loop of a CVSD converter is a simple delta modulator including a comparator 101, sampler 103, slope polarity switch 104 and integrator 102. The delta modulator consists of the comparator 101 in the forward path and the integrator 102 in the feedback path of a simple control loop. The comparator 101 receives the input analog signal and the output signal of the integrator 102. The output signal e(t) of the comparator 101 may be sampled in the sampler 103, and the sample values reflects the sign bit value of the difference between the input voltage signal and the integrator output signal. The sign bit value is a digital signal applied to a slope polarity switch 104 which controls the direction of ramp in the integrator 102. A clock signal is usually applied to the comparator 102 so as to produce a synchronous and band-limited serial bit stream DIGITAL OUT.

The advantages of the delta modulator are simplicity and serial format of its output. The delta modulator limitations are its ability to accurately convert the input signal to within a limited digital bit rate. The analog input signal should be band limited and amplitude limited. The frequency limitations are governed by the nyquist rate, while the amplitude capabilities are set by the gain of the integrator. The frequency limits are bounded on the upper end; that is, for any input bandwidth there exists a clock frequency larger than that bandwidth which will transmit the signal with a specific noise level. However, the amplitude limits are bounded on both upper and lower ends. For a particular signal level, one specific gain will achieve an optimum noise level. Unfortunately, the basic delta modulator has a small dynamic range over which the noise level is constant.

Consequently, the CVSD encoder also includes circuitry, including a level detect processor 105 and slope magnitude control 106, which increases dynamic range of the delta modulator for a given clock frequency and input bandwidth by adjusting the gain of the integrator 102. The level detect processor 105 implements a level detect algorithm which monitors the past few outputs of the delta modulator in a simple shift register. The register may be 4-bits long. One CVSD algorithm simply monitors the contents of the shift register and indicates if it contains all 1s or 0s, which condition is defined as "coincidence." When coincidence occurs, the gain of the integrator 102 may be too small. The coincidence output value charges a single-pole low pass filter of the slope magnitude controller 106. The voltage output of this filter controls the integrator gain from slope polarity switch 104 through a pulse amplitude modulator whose other input is the sign bit or up/down control.

Also, the simplicity of the all 1s, all 0s algorithm provides a measure of the average power or level of the input signal. Other techniques provide more instantaneous information about the shape of the analog input signal curve. The purpose of this one algorithm is to control the gain of the integrator 102 and to increase the dynamic range. The effect of this algorithm is to compand the input signal.

Figure 1B:
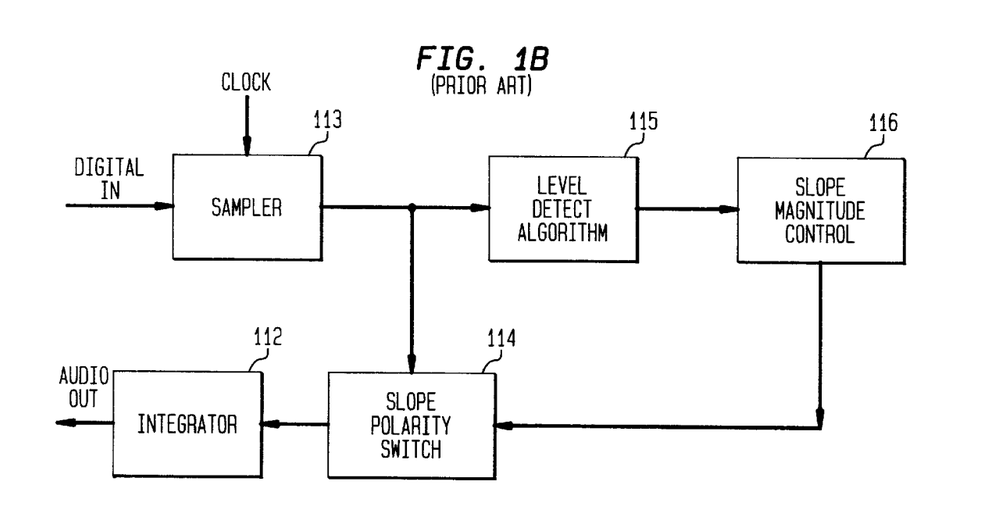
FIG. 1B is a block diagram of a CVSD decoder of the prior art.

A block diagram of a CVSD decoder of the prior art is shown in FIG. 1B. The delta modulator of the CVSD decoder of FIG. 1B includes a sampler 113, a slope polarity switch 114, and integrator 112. The clocked serial bit stream DIGITAL OUT is transmitted to and received by the CVSD decoder as DIGITAL IN, which may include added noise and bit errors. This serial bit stream is applied to the integrator 112 of the delta modulator through slope polarity switch 114 in a similar manner to that of the encoder integrator 102 and slope polarity switch 104. To the extent that the integrator 102 at the transmitting locations tracks the input signal, the remote receiver reproduces the input signal.

However, if a CVSD encoder employing the level detect algorithm previously described is played into a delta modulator of a CVSD decoder, the output signal of the delta modulator will reflect the shape of the input signal, but the level values of output signal will be equal. Thus a similar level detect algorithm is provided in the CVSD decoder by the level detect processor 115 and slope magnitude controller 116 to restore level variations because the digital bit stream in the channel appears as if it were from a standard delta modulator with a constant level input signal. The level detect algorithm is repeated in the receiver and thus the level data is recovered in the receiver. Because this algorithm operates only on the past serial data, it changes the nature of the bit stream without changing the channel bit rate. Low pass filtering of the AUDIO OUT signal eliminates most of the quantizing noise, if the clock rate of the bit stream is an octave or more above the bandwidth of the input signal. Depending on a desired perceived voice quality, voice bandwidth typically is 4.0 kHz and the clock signal rates are typically from 8.0 kHz.

As stated previously, for CVSD encoding the approximation signal is generated by simply integrating the digital data, thus a digital one means "ramp the approximation signal up one 'unit' of voltage from the present value" and a digital zero means "ramp the approximation signal down one 'unit' of voltage from the present value", where 'unit' might be a variable containing an integer value from 1 to 16. The digital value generated (one or zero) is the value that will cause the difference between the applied speech signal and the encoder's approximation signal to be minimized.

Additionally, for CVSD, the generated bits may be passed through a four or three bit shift register so that several contiguous bits can be analyzed as a group. At the conclusion of each bit transmission time the contents of the shift register are analyzed. If all bits within the register are "one" or "zero" the value of 'unit' might be doubled (but not allowing 'unit' to be larger than 16), and if all bits in the shift register are not the same value the value of 'unit' might be halved (but not allowing 'unit' to be less than 1). Thus, if several bits of the same value are generated, the approximation signal is lagging behind the source signal, and the step size of the up/down ramp will be increased. On the other hand, if the bits in the register were never all the same value the step size would be reduced.

The parameters used by the encoder and decoder approximation generators are identical in this case (but it may not always be beneficial for them to be identical). The key parameters are to ramp linearly during one bit time (by means of the integrator), to double the step size if the last N generated bits were the same value or halve the step size if the last N generated bits were not the same value, the specific value of N, etc.

As is apparent from the discussion of the CVSD encoder, any encoder may include a set of parameters to optimize the encoding process of an analog signal. For the CVSD case, these particular parameters might benefit users with higher pitched voices more than those users with lower pitch voices. A different set of parameters might produce better subjective listening scores when lower pitched voices were encoded/decoded compared with higher pitched voices. For an ADPCM based system, for example, as is known in the art, the ADPCM algorithm may try to select a quantization step size large enough to accommodate a maximum peak-to-peak range of an input signal, while also trying to select a quantization size small enough to minimize the variance of quantization noise. Subjective listening scores when lower pitched voices were encoded/decoded with ADPCM compared with higher pitched voices may show a dependence on this trade-off in quantization step size. Consequently, there is a need for a speech encoding system in which one set of parameters which may be more suitable for encoding a person's speech may be used rather than another set of parameters.

Further, in cordless, wireless or similar telecommunication applications with analog baseband processing a "soft signal fade" occurs when characteristics of the transmission media between a handset unit and a base unit changes, for example, when a handset moves through a residence. Soft signal fade is defined as slowly degrading signal/voice quality as heard in the handset. Since a user can hear or sense performance rolloff in the link (reduced link margin), the user may make adjustments to increase the link performance. However, in a digital transmission link, when the link margin is reduced, whole portions of speech blocks are lost since bit error tend to be "bursty" in nature.

SUMMARY OF THE INVENTION

The present invention relates to an encoder for encoding, by a telecommunications transceiver, an analog signal for transmission through a wireless communication channel as a composite digital signal, the encoder including a circuit which measures at least one characteristic value of an analog signal; samples the analog signal to form a digital signal; provides sets of encoding parameters responsive to an encoding information signal; selects one set of the sets of encoding parameters according to each characterization value; associates a corresponding coding value with the selected one set of the plurality of sets of encoding parameters; encodes the digital signal according to the selected set of encoding parameters to provide an encoded digital signal, the encoding also providing the encoding information signal; and combining the encoded digital signal and the coding value to form the composite digital signal. The present invention further relates to a decoder for decoding, by a telecommunications transceiver, a composite digital signal to provide an analog signal, the composite digital signal transmitted over a wireless communication channel and including a coding value and an encoded digital signal, the decoder including a circuit which separates the coding value and the encoded digital signal from the composite digital signal; provides sets of decoding parameters responsive to a decoding information signal; selects one of the sets of decoding parameters according to the coding value; decodes the encoded digital signal according to the set of decoding parameters, the decoding also providing the decoding information signal; and converts the decoded digital signal to the analog signal. The present invention further relates to a system including first and second transceivers, the first transceiver including an encoder in accordance with the present invention and the second transceiver including a decoder in accordance with the present invention.

BRIEF DESCRIPTION OF THE DRAWINGS

The aforementioned features and benefits of the invention will be better understood from a consideration of the detailed description which follows taken in conjunction with the accompanying drawings, in which.

DETAILED DESCRIPTION

Overview

The present invention relates to a speech encoder/decoder system for a transceiver set of a cordless, wireless or similar telecommunication station set employing digital transmission in which 1) the encoding and decoding operations are complimentary, and 2) the encoding and decoding operations make use of sets of parameters which may be optimized for a speaker and for a particular digital radio link. A number of sets of parameters are determined experimentally, for example, by employing human sample groups in which perceived audio and transmission quality are tested. The encoder/decoder system then employs a group, or number, of sets of parameters serving all speakers rather than employing one fixed set of parameters. The particular set of parameters for a speaker in the encoder of a first transceiver is determined by a processor which receives values based on an analysis of the input audio signal, and then a parameter set identifier is sent within the digital signal for use by a decoder of a second transceiver. In addition, the processor of the first transceiver which receives a signal from the second transceiver may include circuitry which monitors the signal to noise ratio and bit error rate of the channel to provide a second criteria in addition to the received values based on the analysis of the input audio signal for choosing a particular set of parameters for the encoder.

For one exemplary embodiment, the variable sets of parameters are employed within a CVSD encoder/decoder system. In another exemplary embodiment, the variable sets of parameters are employed within an ADPCM encoder/decoder system. However the present invention may be embodied in other speech encoding/decoding systems, and the present invention is not limited to these exemplary embodiments.

Figure 2:
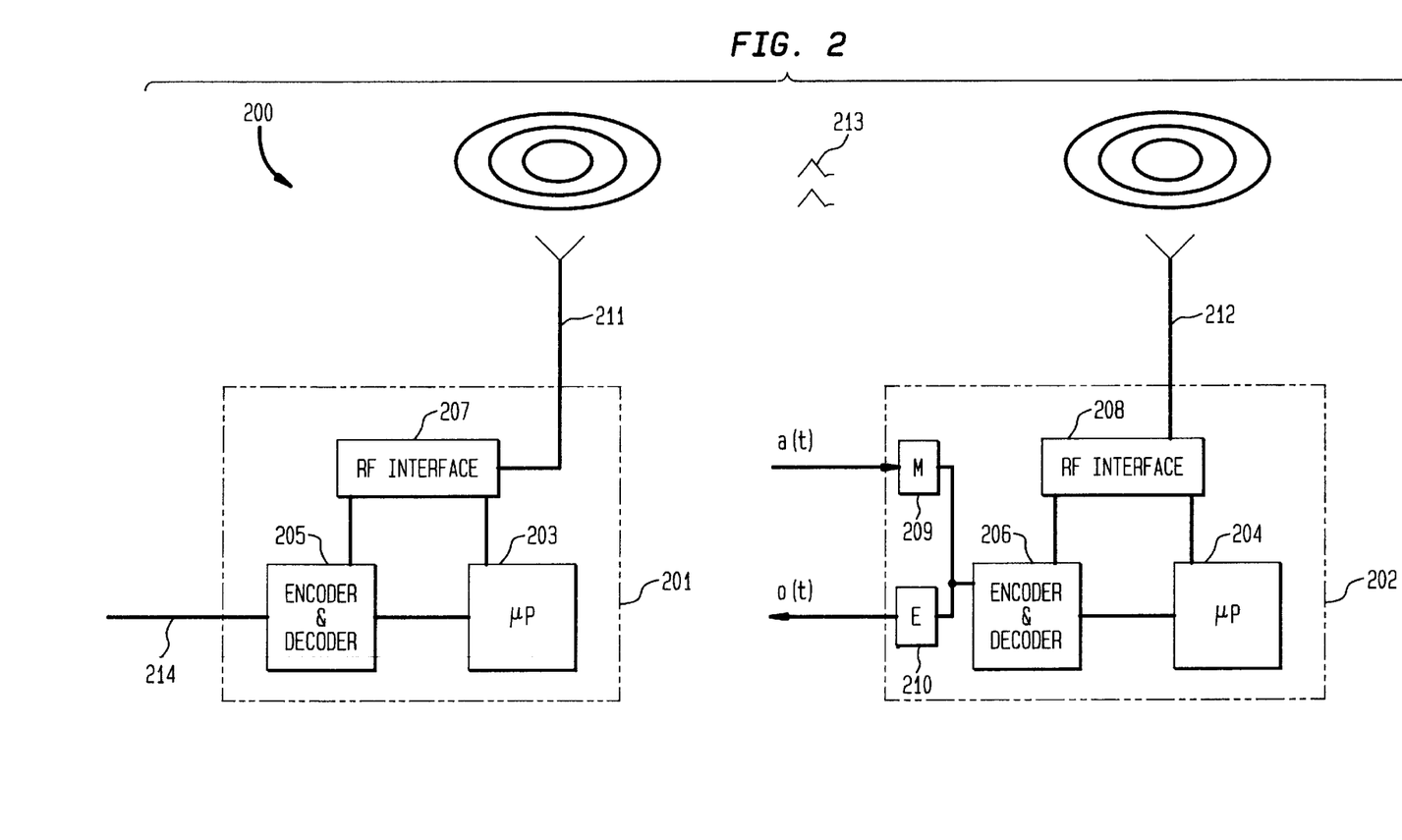
FIG. 2 is a block diagram of a telephone handset system having a base unit and handset unit providing a variable set of encoding and decoding parameters in accordance with the present invention.

FIG. 2 is a block diagram of a telephone handset system 200 having a first transceiver, herein referred to as a base unit 201, and a second transceiver, herein referred to as a handset unit 202, each providing a variable set of encoding and decoding parameters in accordance with the present invention. As shown, base unit 201 includes a controller 203, encoder/decoder 205 and radio frequency (RF) interface 207. Handset unit 202 includes controller 204, encoder/decoder 206 and RF interface 208. Handset unit 202 also may include a analog microphone "M" (for "mouthpiece") 209 receiving an analog voice signal a(t) and speaker 210 "E" (for "earpiece") providing an analog output signal o(t). The base station 201 may receive from, and provide to, a local telephone company the signaling and voice/data information through bi-directional line 214. As is known in the art, base station 201 includes circuitry, not shown, to interface and supervise communications over bi-directional line 214.

Base station 201 and handset unit 202 are in telecommunication through digital transmission over RF communication link 213 using antennae 211 and 212, respectively. For the following discussion, analog voice is encoded in the handset unit 202 and decoded in the base station 201; however, as would be apparent to one skilled in the art, analog signals may be encoded in the base station and transmitted to the handset unit 202 in accordance with the present invention. For convenience, a transmission from a first transceiver, for example a base station 201, to a second transceiver, such as a handset unit 202, is termed a "forward channel" and a communication to first transceiver from the second transceiver is termed a "reverse channel."

A user may talk to into the microphone 209, providing an analog signal waveform a(t) representing the user's voice. The signal a(t) is provided to the encoder/decoder 206, which samples and converts the signal a(t) to a digital signal. The encoder of the encoder/decoder 206 monitors and determines a speech characteristic which is provided to the controller 204, which selects a corresponding set of encoding parameters in accordance with the present invention. Controller 204 may also receive information from RF interface 208 as to transmission link quality of the RF communication link 213, such as bit error rate and signal to noise ratio. Consequently, controller 204 supervises the encoding operation based on the speech characteristic and/or the link quality.

Once encoded, the RF interface 208 frequency or amplitude modulates the encoded digital signal onto a carrier, or may employ other well known techniques such as spread spectrum modulation, and provides the modulated encoded digital signal to the antenna 212 for transmission over the RF communication link 213. Antenna 211 of the base station 201 receives the modulated encoded digital signal at the antenna 211, and the RF interface 207 demodulates the signal and provides the encoded digital signal to the decoder of encoder/decoder 205. Controller 203 receives information from the decoder of encoder/decoder 205 as to the set of encoding parameters used to encode the digital signal, and selects the corresponding set of decoding parameters in accordance with the present invention. The decoder of encoder/decoder 205 then decodes the digital signal to produce a reconstructed analog signal a'(t). However, a'(t) may not necessarily be provided to bi-directional communication line 214. The decoded digital signal may be directly transcoded, or the reconstructed re-encoded, to be provided in any pre-selected format.

Encoder/Decoder System Monitoring Speech Characteristics

Figure 3:
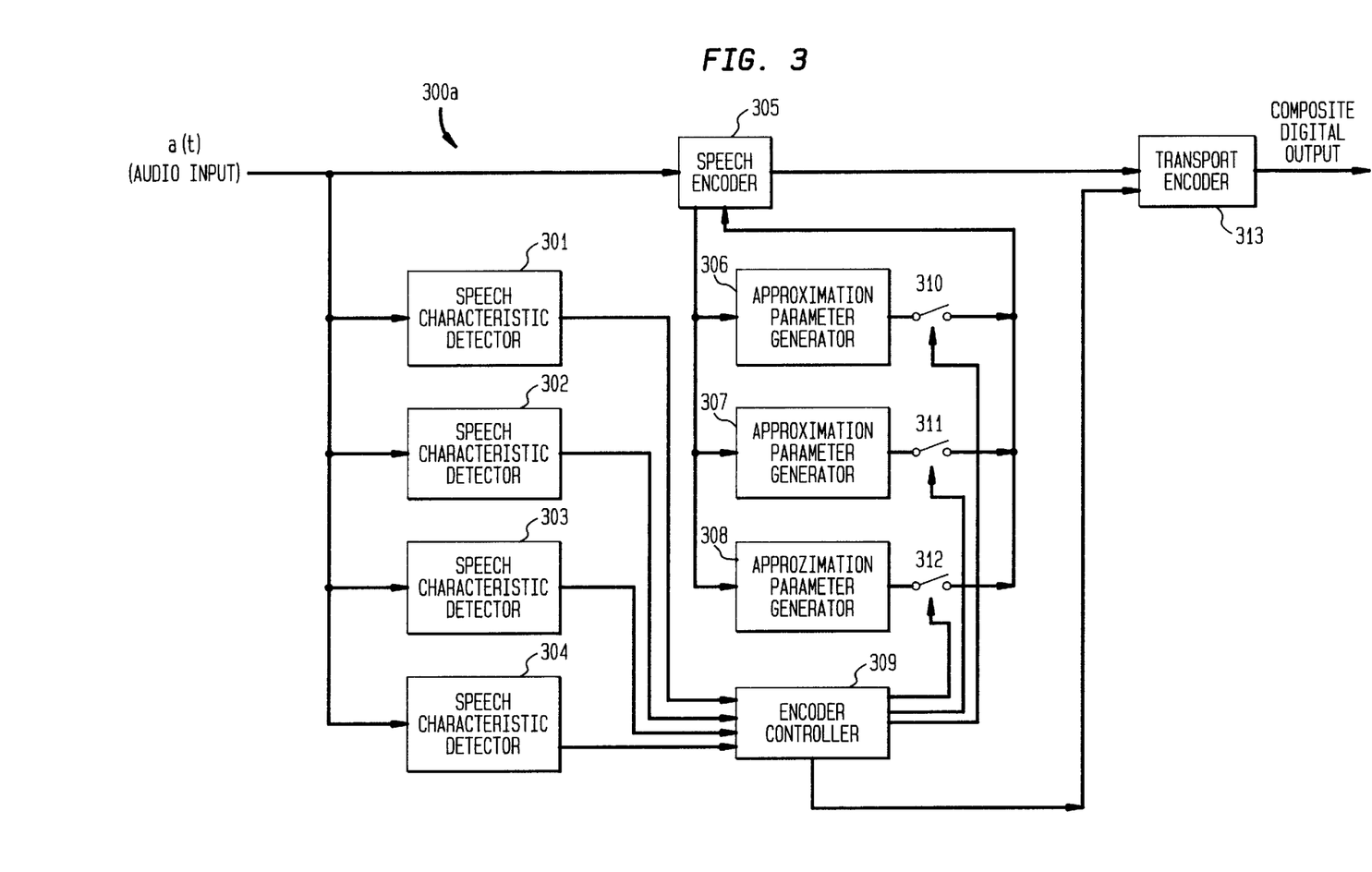
FIG. 3 is a block diagram illustrating an exemplary embodiment of a speech encoder in accordance with the present invention.

A first exemplary embodiment of a encoder/decoder system in accordance with the present invention for the encoder/decoders 205 and 206 and controller 203 and 204 of FIG. 2 is now described. FIG. 3 is a block diagram illustrating an exemplary embodiment of a speech encoder system 300a in accordance with the present invention which monitors speech characteristics of the analog input signal a(t). The speech encoder 300a includes a group of speech characteristic detectors 301–304, a speech encoder 305, a controller 309, a group of approximation parameter generators 306–308, selector switches 310–312, and transport encoder 313.

Referring to FIG. 3, the speech encoder circuit 305 receives the analog input signal a(t), samples the signal, and encodes the sampled signal to provide speech data as an output digital signal. Speech encoder 305 may be a simple delta modulator or a CVSD encoder, for example, or may be a more complex encoder such an ADPCM encoder. As previously described with reference to the prior art, such speech encoder 305 receives approximation information and provides comparative information related to the input signal. Such approximation information may be generated from sets of encoding parameters provided from one of the approximation parameter generators 306–308, and may be an output of an integrator approximation of the input signal for the CVSD encoder case, or an output of a general predictive approximation of the input signal for the ADPCM encoder case. Such comparative information may be a difference signal between the analog signal a(t) and an output of an integrator approximation of the input signal for the CVSD encoder case, or may be a difference between the analog signal a(t) and an output of a general predictive approximation of the input signal for the ADPCM encoder case.

Each of the speech characteristic detectors 301–304 monitor and sample the audio input signal a(t) to provide a respective "score" value of the signal a(t). As an example, the characteristic detectors 301–304 may be implemented as band pass filters with peak detectors at their outputs. The score value may be based on any predetermined criteria, such as dominant power of selected frequency bands, dominant pitch, or signal to noise ratio within certain frequency bands; these criteria may relate to perceived quality of reconstructed audio signals as determined through human test groups.

The various sets of speech encoder parameters are generated by the approximation parameter generators 306–308. Each set of parameters corresponds to a one or more speech characteristic values and are generated in manner optimized prior to implementation. While FIG. 3 illustrates the exemplary system having each set of parameters generated by a circuit receiving one input signal and providing one output signal, the present invention is not so limited to these input and output signals, and is not limited to only this number of generators (306–308). For example, in a case where the speech encoder is implemented with a digital signal processor, the approximation parameter generators 306–308 and respective switches 310–312 may simply be implemented as a memory devices containing tables which are addressed by the controller 309; but in the case of the approximation parameter generators 306–308 implemented with analog devices, respective switches 310–312 may be implemented as relays closed and opened by the controller 309.

The encoder controller 309, which may be a microcomputer or alternatively a state machine, receives each score value and relates the highest or best match score value of the speech detector characteristic detectors 301–304 to one of the set of encoding parameters generated by approximation parameter generators 306–308. The controller 309 then closes the corresponding switch of switches 310–312. In a further embodiment, the controller 309 continues to monitor the score values provided by speech detector characteristic detectors 301–304 and may change which of the approximation parameter generators are selected. In addition, the controller 309 may communicate to a speech decoder system's controller which set of approximation parameters should be selected for decoding by adding a codeword to the digital data stream from the speech encoder 305.

Figure 7A:
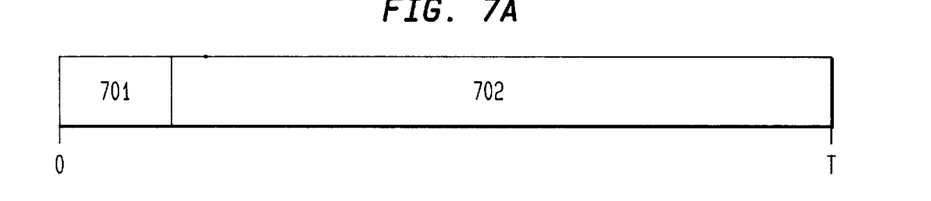
FIG. 7A illustrates a data format of a transport encoder employing a time-division multiplexer for the exemplary encoder of FIG. 3 or FIG. 4.

Transport encoder 313 forms a composite digital output signal from the digital data stream and at least one codeword from the encoder controller 309, and the composite digital output signal is provided to the RF interface 208 of the handset unit 202 (FIG. 2). Transport encoder 313 may be implemented, for example, as a time division multiplexer which inserts the codeword into the digital data stream from the controller 309 at predetermined intervals of time. FIG. 7A illustrates a data format of a transport encoder employing a time-division multiplexer for the exemplary encoder of FIG. 3 or FIG. 4 (described subsequently). As shown in FIG. 7A, encoded speech data provided as the composite digital output signal in a frame period of time 0 to T includes frame information 701 and speech data 702. The information 701 is inserted before encoded speech data 702 and may include one or more framing bits as well a the codeword provided by controller 309.

Figure 7B:
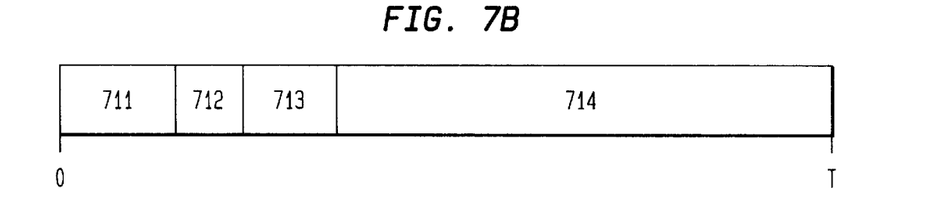
FIG. 7B illustrates a data packet format of a transport encoder employing a packetizer for the exemplary encoder of FIG. 3 or FIG. 4.

Alternatively transport encoder 313 may be implemented, for example, as a packet multiplexer which forms segments of the digital data stream from the controller 309 and then forms the composite digital output signal as a transport data packet by adding a header, and packet header and other packet information which includes the codeword. FIG. 7B illustrates a data packet format of a transport encoder employing a packetizer for the exemplary encoder of FIG. 3 or FIG. 4 (described subsequently). As shown in FIG. 7A, encoded speech data provided as the composite digital output signal in a frame period of time 0 to T includes preamble 711, packet identifier 712, codeword 703 (which may also include signaling)and speech data 714.

Figure 5:
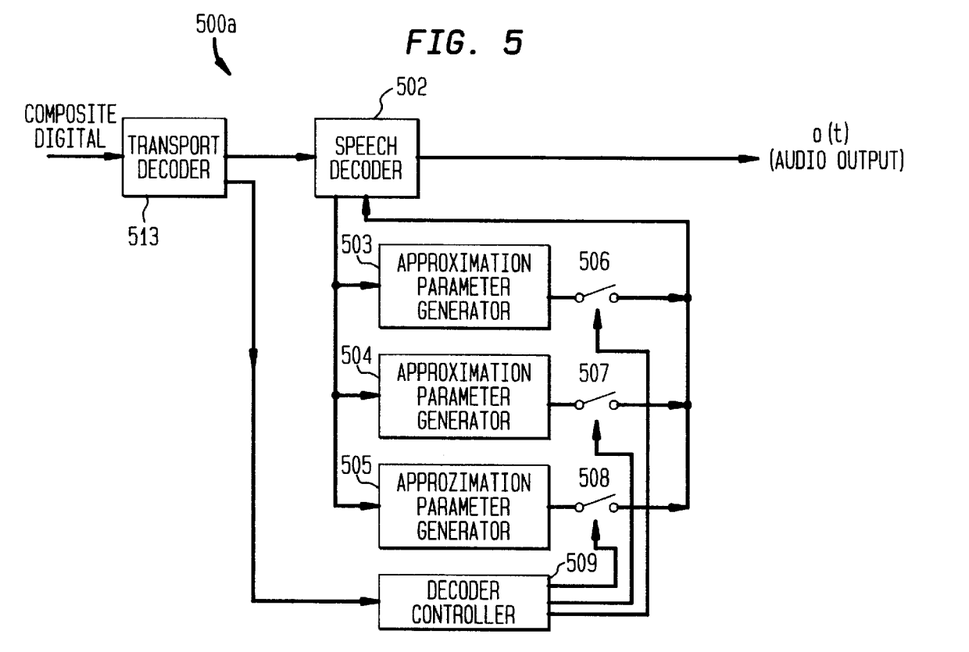
FIG. 5 is a block diagram illustrating an exemplary embodiment of a speech decoder in accordance with the present invention.

FIG. 5 is a block diagram illustrating an exemplary embodiment of a speech decoder system 500a in accordance with the present invention. The speech decoder system 500a includes a transport decoder 513, a speech decoder 502, and decoder controller 509 and approximation parameter generators 503–505 having respective switches 506–508.

Transport decoder 513 receives a composite digital signal which is the composite digital output signal of the handset unit 202 transmitted through the RF communication link 213, demodulated and provided by the RF interface 207 of, for example, the base station 201 (FIG. 2). Transport decoder 513 provides a received digital data stream to the speech decoder 502, and the codeword from the encoder controller 309 to the decoder controller 509. Decoder controller 509, based on the codeword, selects a corresponding one approximation parameter generators 503–505 by closing the respective one of the switches 506–508. Approximation parameter generators 503–505 correspond to matching ones of the approximation parameter generators 306–308 of the encoder system 300a. Finally, speech decoder 502, which decodes in accordance with the encoding method of the speech encoder 305 of the encoder system 300a, provides an analog signal from the received digital data stream based on the selected set of parameters generated by the selected approximation parameter generator using comparison information of the speech decoder 502.

Encoder/Decoder System Monitoring Link Quality

Figure 4:
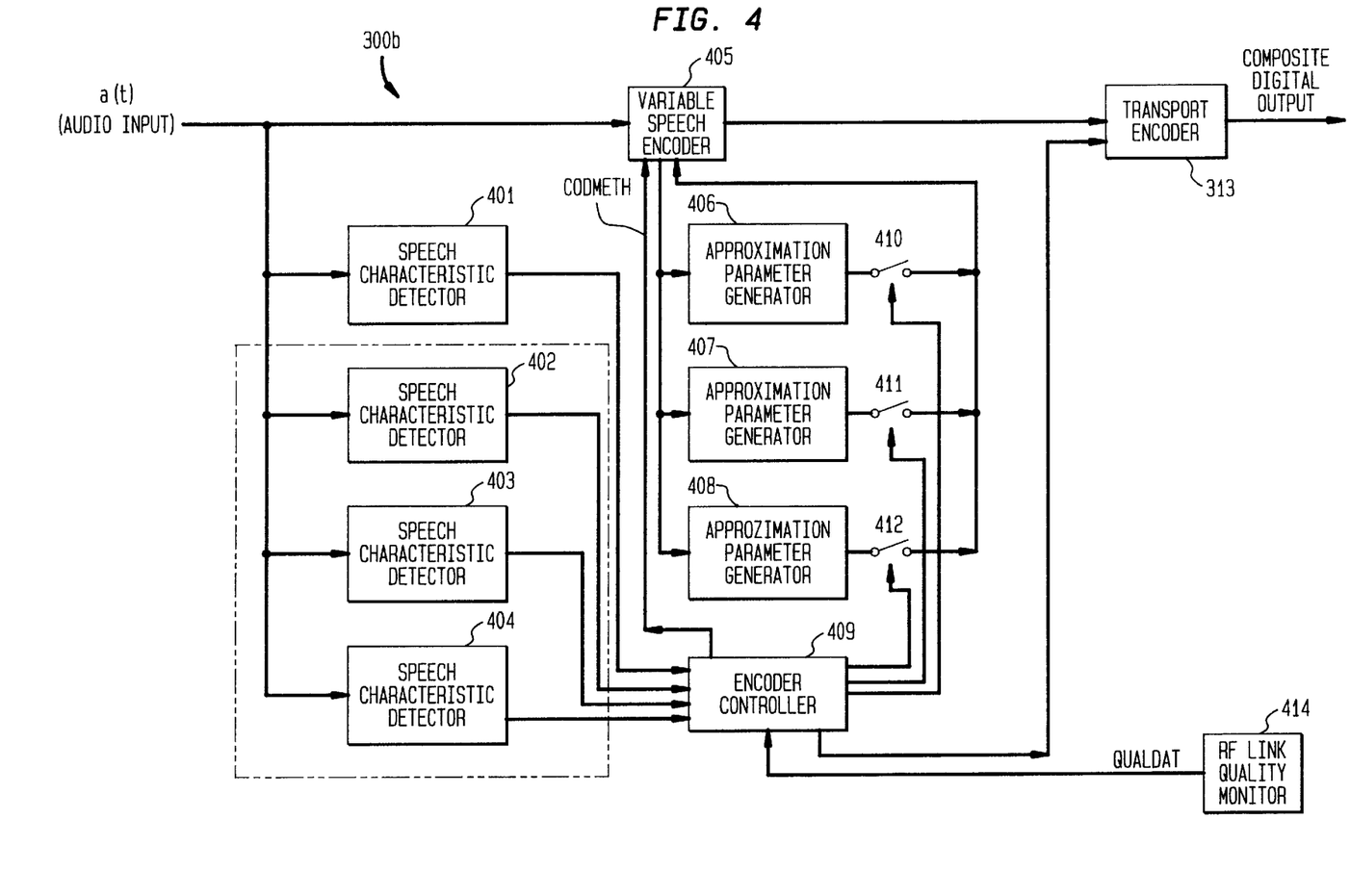
FIG. 4 is a block diagram illustrating an exemplary embodiment of a speech encoder employing variable encoding according to measured link quality in accordance with the present invention.

A second exemplary embodiment of the present invention may employ an encoder/decoder system for the encoder/decoders 205 and 206 and controllers 203 and 204. Such system is similar to that described for the encoder/decoder system which only monitors the analog input signal a(t). FIG. 4 is a block diagram illustrating an exemplary embodiment of a speech encoder system 300b employing variable encoding according to measured link quality in accordance with the present invention. The speech encoder 300b includes a speech characteristic detector 401, a variable speech encoder 405, a decoder controller 409, a group of approximation parameter generators 406–408, selector switches 410–412, and transport encoder 413.

Referring to FIG. 4, the variable speech encoder circuit 405 receives the analog input signal a(t), samples the signal, and encodes the sampled signal to provide speech data as an output digital signal. Variable speech encoder 405 may be a predictive or companding encoder, such an ADPCM encoder, which reduces the number of bits per sample of the sampled input signal. Such speech encoder 405 receives approximation information and provides comparative information related to the input signal. Such approximation information may be generated from sets of encoding parameters provided from one of the approximation parameter generators 406–408, and may be an output of a general predictive approximation of the input signal for the ADPCM encoder case. Such comparative information may be a difference signal between the analog signal a(t) and the general predictive approximation of the input signal for the ADPCM encoder case.

The speech characteristic detector 401 monitors and samples the audio input signal a(t) to provide a respective signal power measure, such as power within the speech signal bandwidth or maximum peak-to-peak power level, for example, of the signal a(t). As an example, the characteristic detector 401 may be implemented as one or more band pass filters each having a corresponding peak detector.

The various sets of speech encoder parameters are generated by the approximation parameter generators 406–408. Each set of parameters corresponds to an encoding method of the input signal, which parameter values are generated in manner optimized prior to implementation. For example, for an ADPCM encoding method, the analog input signal a(t) may be sampled and encoded with one of 2-bit (16 kbit/sec encoding rate), 3-bit (24 kbit/sec encoding rate), 4-bit (32 kbit/sec encoding rate) or 8-bit (full Pulse Code Modulation) words. As quality of the RF communication link 213 is reduced, the signal to noise ratio may indicate that a higher energy per bit may be required for transmission. Consequently, the encoder of the present invention may choose 2-bit encoding of the samples if the input analog signal has high peak-to-peak power values, high overall signal power, and/or a high RF communication link quality measure, but may choose 8-bit encoding if the input analog signal has low peak-to-peak power values and/or low overall signal power in a link with low quality measure.

In other words, the encoder controller 409 monitors the received signal strength and/or bit error rate as indicated by RF link quality monitor 414. If information about the input analog signal a(t) is available, the encoder controller 409 makes adjustments to the coded data rate through an instruction given to variable speech encoder 405 when necessary. Thus, when link quality is degraded to a certain level, the encoder controller 409 decreases the data rate, essentially increasing the energy per bit. While this operation may degrade the perceived audio signal at the receiving transceiver, the operation may allow a greater signal margin. Consequently, if the receiving transceiver is a handset, for example, the handset user may make adjustments to the link, such as by moving closer to the transceiver of the base station or by making a manual adjustment to increase signal power.

For each encoding method, a different set of approximation parameters may be required. In the ADPCM case these approximation parameters may be different sets of quantization levels used for each peak-to-peak power and overall signal power of the analog input signal when compared to a quality of the RF communication link.

The encoder controller 409 receives a measure of a quality of the RF communication link 213 (FIG. 2), QUALDAT, from an RF link quality monitor 414, which may be part of the RF interface 207 or 208. Such quality measurement may be made by, for example, measuring a signal to noise ratio of the received RF signal, or by calculating a total composite bit error rate from the error rate of framing bits or packet headers of received transport encoded signals. The encoder controller 409 also receives the signal power measure of the input analog signal. With the signal power measure and the QUALDAT value, the encoder controller 409 determines a best match for the encoding method to be used, which will have a corresponding one of the set of encoding parameters generated by approximation parameter generators 406–408. The encoder controller 409 then provides the encoding method value CODMETH to the variable speech encoder 405, which encodes the analog input signal in accordance with this encoding method. The encoder controller 409 then closes the corresponding switch of switches 410–412.

In a further embodiment, the encoder controller 409 continues to monitor the QUALDAT value and the signal power measure provided by the speech detector characteristic detector 401 and may change the encoding method, CODMETH, and the corresponding one of the approximation parameter generators selected. In addition, the controller 309 may communicate to a speech decoder system's controller which set of approximation parameters should be selected for decoding by adding a codeword to the digital data stream from the speech encoder is 305.

In a similar manner as described with reference to FIG. 3, the transport encoder 313 combines the digital bit stream of the variable speech encoder 405 with a codeword from the encoder controller 409 to provide a composite digital output signal, which is provided to the RF interface for transmission.

Figure 8:
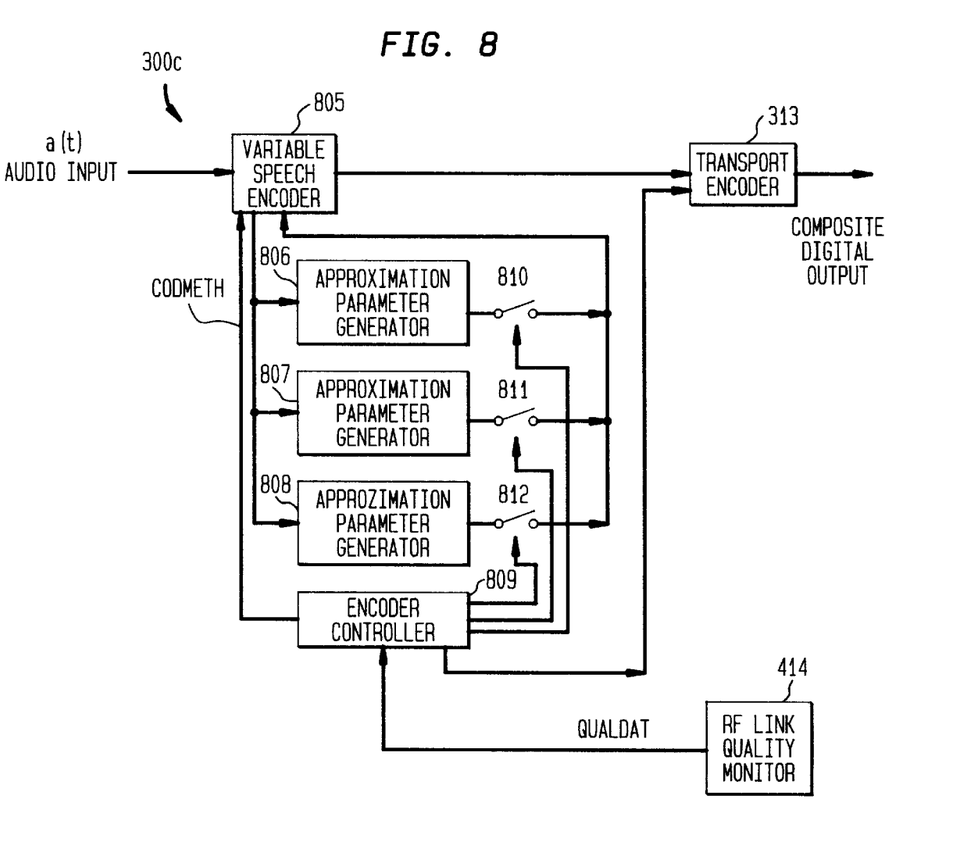
FIG. 8 is a block diagram illustrating an alternative exemplary embodiment of a speech encoder employing variable encoding according to measured link quality in accordance with the present invention.

FIG. 8 is a block diagram illustrating an alternative exemplary embodiment of a speech encoder employing variable encoding according to measured link quality in accordance with the present invention. The alternative embodiment of the speech encoder system 300c as shown in FIG. 8 includes RF link quality monitor 414, encoder controller 809, parameter generators 806–809 with corresponding switches 810–812, and variable speech encoder 805. The operation of these elements is similar to that of like elements of the encoder system 300b of FIG. 4. For this embodiment, the encoder controller 809 monitors the received signal strength and/or bit error rate as indicated by RF link quality monitor 414 and makes adjustments to the coded data rate through an instruction given to variable speech encoder 805. Thus, when link quality is degraded, the encoder controller 809 decreases the data rate, essentially increasing the energy per bit. As before, this operation may degrade the perceived audio signal at the receiving transceiver, the operation may allow a greater signal margin. Consequently, if the receiving transceiver is a handset, for example, the handset user may make adjustments to the link, such as by moving closer to the transceiver of the base station or by making a manual adjustment to increase signal power.

Figure 9:
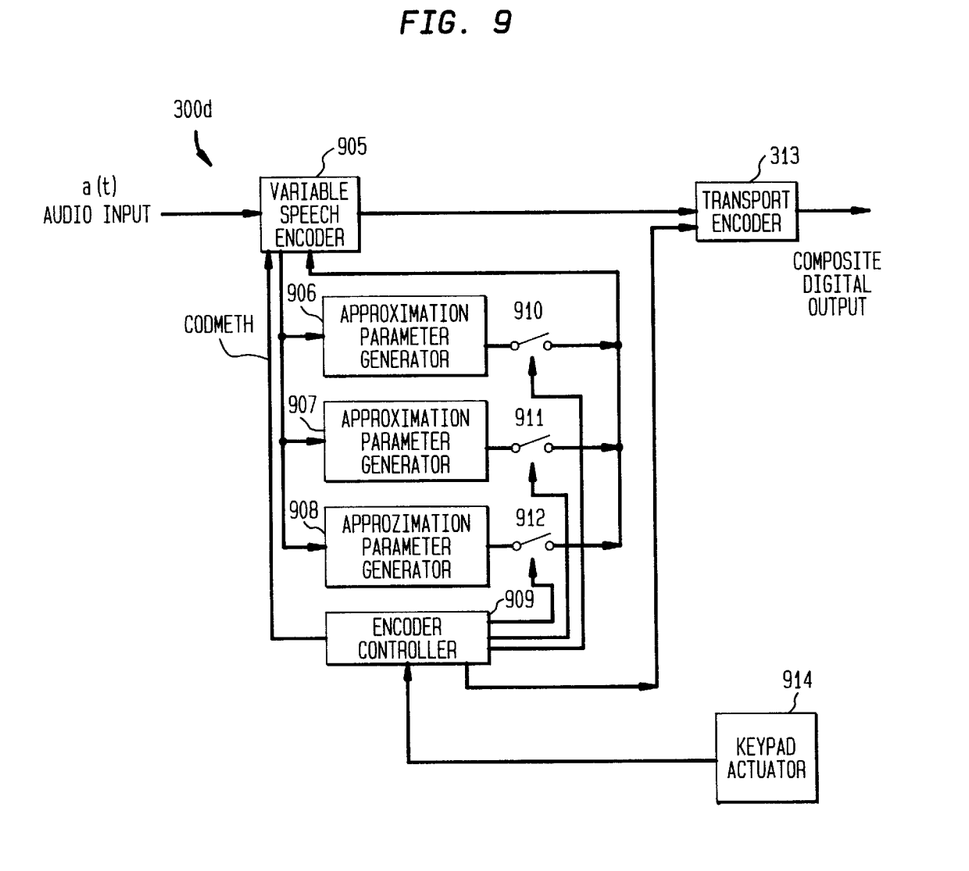
FIG. 9 is a block diagram illustrating an exemplary embodiment of a speech encoder employing a manual actuator allowing a user to modify variable encoding according to perceived link quality in accordance with the present invention.

FIG. 9 is a block diagram illustrating an exemplary embodiment of a speech encoder system 300d employing a manual actuator allowing a user to modify variable encoding according to perceived link quality in accordance with the present invention. The alternative embodiment of the speech encoder system 300d as shown in FIG. 8 includes keypad actuator 914, encoder controller 909, parameter generators 906–909 with corresponding switches 910–912, and variable speech encoder 905. The operation of these elements is similar to that of like elements of the encoder system 300b of FIG. 4. For this embodiment, the encoder controller 909 monitors the keypad actuator 914 for a user-input encoding value. For example, the user-input encoding value corresponds to a predefined key on a keypad which the user may press while participating in a telephone call to "tailor" the encoding of the call to the perceived speech quality. Based on the received user-input encoding value, the encoder controller 909 makes adjustments to the coded data rate through an instruction CODMETH given to variable speech encoder 905.

Figure 6:
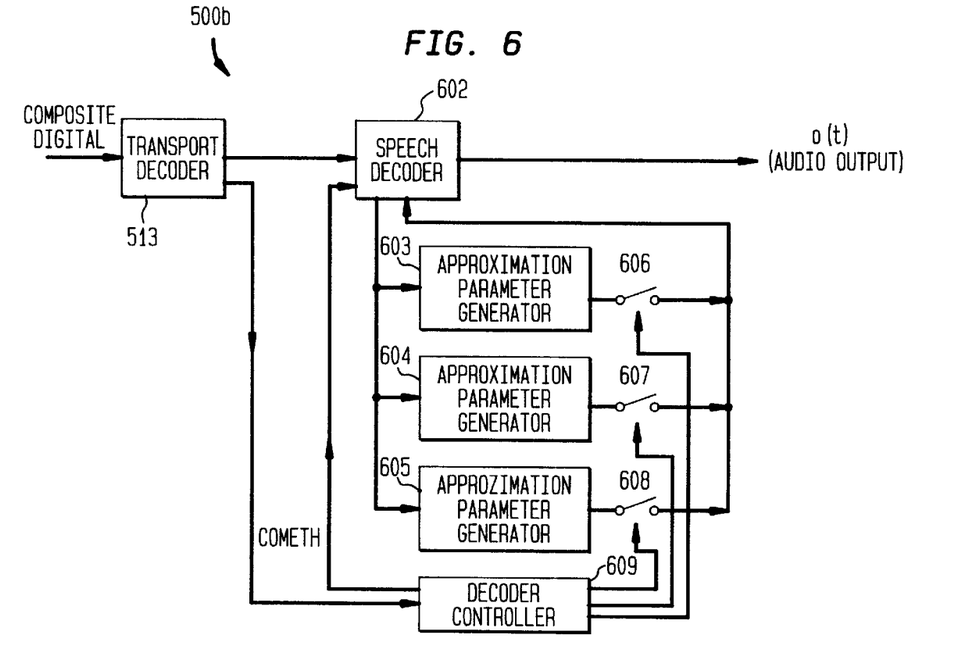
FIG. 6 is a block diagram illustrating an exemplary embodiment of a speech decoder employing variable decoding according to measured link quality in accordance with the present invention.

FIG. 6 is a block diagram illustrating an exemplary embodiment of a speech decoder employing variable decoding according to measured link quality in accordance with the present invention. The speech decoder system 500b includes a transport decoder 513, a variable speech decoder 602, and decoder controller 609 and approximation parameter generators 603–605 having respective switches 606–608.

Transport decoder 513 receives a composite digital signal which is the composite digital output signal of the handset unit 202 transmitted through the RF communication link 213, demodulated and provided by the RF interface 207 of, for example, the base station 201 (FIG. 2). Transport decoder 513 provides a received digital data stream to the variable speech decoder 602, and the codeword from the encoder controller 409 to the decoder controller 609. Decoder controller 609, based on the codeword, selects a corresponding one of the approximation parameter generators 603–605 by closing the respective one of the switches 606–608. Approximation parameter generators 603–605 correspond to matching ones of the approximation parameter generators 406–408 of the encoder system 360b. Finally, variable speech decoder 602, which decodes in accordance with the encoding method of the speech encoder 405 of the encoder system 300b, provides an analog signal from the received digital data stream based on the encoding method from the CODMETH value of the received codeword and the selected set of parameters generated by the selected approximation parameter generator using comparison information of the speech decoder 502.

While the second embodiment of the present invention has been described with respect to modifying the encoding based on RF communication link quality, a further embodiment of the present invention may include both techniques of the first and second embodiments. For this case, the set of encoding parameters would be based both on the score value of the input speech and the link quality to determine an encoding method and the optimal set of encoding parameters. Referring to FIG. 4, additional speech detector characteristic detectors 402–404 are added. For such case, and using ADPCM as an example, the ADPCM encoding rate may be varied from a low value, such as 2 bits per sample (16 kb/s) ADPCM to full 8 bits per sample (64 kb/s or standard PCM) depending on the score value of the input analog speech signal and the link quality measure.

However, for each encoding type and each speech detector characteristic, the controller may select a set of ADPCM encoding parameters which have, for example, an optimized quantization step size to accommodate a maximum peak-to-peak range of an input signal while also having a quantization size small enough to minimize the variance of quantization noise for a given speech characteristic detector score value. As would be apparent to one skilled in the art, the approximation parameter generators 406–408 would be modified to take these different quantization sizes into account. Consequently, the controller 409 provides the variable speech encoder 405 with the appropriate ADPCM encoding rate CODMETH, while also selecting the appropriate set of approximation parameters by closing the appropriate one of switches 410–412. The encoding rate, and the set of approximation parameters would be added to the composite digital output signal by the transport encoder 413.

A similar embodiment would be easily extended to a CVSD encoding/decoding system by one skilled in the art.

Similarly, the switches of embodiments of the present invention may be implemented by many different methods, as would be apparent to one skilled in the art. For example, these switches may be transistors, relays, or multiplexing circuitry.

While the previous discussion of exemplary embodiments described particular circuits in relation to the exemplary embodiments, the present invention is not so limited. Any analog input signal may be sampled to form a digital representation of the analog input signal, and the various functions, such as filter circuits, may be implemented using digital signal processing techniques. Further, a controller may not be a microprocessor, but rather a simple state machine. The controller may not be a separate element, but rather the functionality may be embodied by letting score values of speech characteristic detectors 301–304 (FIG. 3), for example, be used to address and enable the appropriate one of switches 310–312 to select the desired approximation parameter generator 306–308.

Although the foregoing detailed description has described the present invention primarily in terms of particular applications of a base station and handset system and accompanying methods, it should be understood that the embodiments discussed are exemplary only. Many variations may be made in the arrangements shown, including the types of processors used, encoding, and decoding methods employed, methods to determine sets of parameters, and circuitry used to implement the present invention. Also, the present invention is not limited to a local telephone station, but the features described herein may be implemented in other telecommunications network devices incorporating a radio link over which digital signals generated from analog signals are transmitted. These and other alternatives and variations will be readily apparent to those skilled in the art, and the present invention is therefore limited only by the appended claims.

What is claimed:

1. An encoding apparatus of a telecommunications transceiver for converting an analog signal to a composite digital signal for transmission over a wireless communication channel, the encoding apparatus comprising:
   an analog signal characterization circuit which concurrently measures a plurality of characteristics of the analog signal to concurrently provide a plurality of characterization values:
   a sampling circuit which samples the analog signal to form a digital signal;
   a parameter generator circuit, providing a plurality of sets of encoding parameters;
   processor that sequentially (1) selects at least one characterization value of the plurality of the characterization values, (2) then selects a set of encoding parameters of the plurality of sets of encoding parameters, and (3) then provides the selected one set to the digital encoding circuit and provides a corresponding coding value;
   a digital encoding circuit which encodes the digital signal according to the selected set of encoding parameters; and
   a combining circuit which combines the encoded digital signal and the coding value to form the composite digital signal, wherein
   the analog signal characterization circuit includes a plurality of voice characteristic measurement circuits, each voice characteristic circuit including a filter which bandpass filters the analog signal and an integrator which integrates the bandpass filtered analog signal to measure as one characterization value a signal power of the analog signal within a respective frequency band, and each set of the plurality of sets of encoding parameters provided by the parameter generator circuit is optimized for a corresponding one characterization value.

2. The encoding apparatus as recited in claim 1, wherein:
the analog signal characterization circuit includes 1) a signal level detection circuit which measures as one characterization value a signal power of the analog signal within a respective frequency band, and 2) a channel measurement processor which measures a channel quality value of the wireless communication channel;

each set of encoding parameters provided by the parameter generator circuit being optimized for a corresponding one coding value, the processor, responsive to the characterization value and the channel quality value, selects one of a set of encoding algorithms for the coding value and selects the corresponding one of the plurality of sets of encoding parameters, and the digital encoding circuit further encodes the digital signal according to the coding value.

3. The encoding apparatus as recited in claim 2, wherein the channel measurement processor measures as the channel quality value at least one of a bit error rate, a signal to noise ratio and a channel fading characteristic.

4. The encoding apparatus as recited in claim 1, wherein the combining circuit is a time division multiplexer which periodically inserts the coding value into the encoded digital signal to form the composite digital signal.

5. The encoding apparatus as recited in claim 1, wherein the combining circuit is a packet multiplexer which forms the composite digital signal as a plurality of packets, each packet formed from a respective portion of the encoded digital signal, the coding value, and a header value.

6. The encoding apparatus as recited in claim 1, wherein the digital encoding circuit encodes according to an encoding algorithm selected from the group consisting of delta modulation, continuously variable delta modulation, pulse code modulation, adaptive pulse code modulation and predictive encoding.

7. The encoding apparatus as recited in claim 1, wherein the encoding apparatus is included on an integrated circuit device.

8. A telecommunications system which encodes an analog signal as a digital signal, transmits the encoded analog signal as a portion of a composite digital signal over a wireless communication channel, and decodes the transmitted composite digital signal to provide an analog output signal, the system comprising:

a first transceiver which encodes the analog signal comprising:

an analog signal characterization circuit which concurrently measures a plurality of characteristics of the analog signal to concurrently provide a plurality of respective characterization values;

a sampling circuit which samples the analog signal to form a digital signal;

first parameter generator circuit providing a plurality of sets of encoding parameters;

a first processor that sequentially (1) selects at least one characterization value of the plurality of the characterization values, (2) then selects a set of encoding parameters of the plurality of sets of encoding parameters, and (3) then provides the selected one set to the digital encoding circuit and provides a corresponding coding value;

a digital encoding circuit which encodes the digital signal according to the selected set of encoding parameters;

a combining circuit which combines the encoded digital signal and the coding value to form the composite digital signal; and a transmitter which modulates the composite digital signal onto a carrier for transmission through the wireless communication channel; and a second transceiver which decodes the transmitted composite digital signal comprising:

a receiver which demodulates the composite digital signal from the modulated carrier received from the wireless communication channel;

a signal separation circuit which provides the coding value and the encoded digital signal from the transmitted composite digital signal;

a second parameter generator circuit providing a plurality of sets of decoding parameters;

a second processor that communicates a selection of one set of the plurality of sets of decoding parameters of the second parameter generator circuit according to the coding value;

a digital decoding circuit which decodes the encoded digital signal according to the selected set of decoding parameters; and a digital to analog converter which converts the decoded digital signal to the analog output signal, wherein the analog signal characterization circuit of the first transceiver includes a plurality of voice characteristic measurement circuits, each voice characteristic circuit including a filter which bandpass filters the analog signal and an integrator which integrates the bandpass filtered analog signal to measure as one characterization value a signal power of the analog signal within a respective frequency band, and each set of encoding parameters and each set of decoding parameters are optimized for a corresponding one characterization value.

9. The telecommunications system as recited in claim 8, wherein:

the analog signal characterization circuit of the first transceiver includes 1) a signal level detection circuit which measures as one characterization value a signal power of the analog signal within a respective frequency band, and 2) a channel measurement processor which measures a channel quality value of the wireless communication channel;

each set of the plurality of sets of encoding parameters and each set of the plurality of sets of decoding parameters being optimized for a corresponding one coding value, the first processor, responsive to the characterization value and the channel quality value, selects one of a set of encoding algorithms corresponding to the coding value and selects the corresponding one set of the plurality of sets of encoding parameters;

the digital encoding circuit further encodes the digital signal according to the coding value; and the second processor selects a decoding algorithm corresponding to the coding value, and the digital decoding circuit further decodes the encoded digital signal according to the selected decoding algorithm.

10. The telecommunications system as recited in claim 9, wherein the measured channel quality value of the channel measurement processor of the first transceiver measures at least one of a bit error rate, the signal to noise ratio and the channel fading characteristic of the wireless communication channel.

11. The telecommunications system as recited in claim 10, wherein the second transceiver transmits a reverse channel signal to the first transceiver over the wireless communication channel, and the first transceiver measures at least one of the bit error rate, the signal to noise ratio and the channel fading characteristic of the reverse channel signal.

12. The telecommunications system as recited in claim 10, wherein the second transceiver transmits a reverse channel signal to the first transceiver over the wireless communication channel, and the second transceiver measures as the channel quality value at least one of the bit error rate, the signal to noise ratio and the channel fading characteristic of the modulated composite digital signal transmitted through the wireless communication channel and provides the channel quality value to the first transceiver with the reverse channel signal.

13. A method of encoding an analog signal by a transceiver for transmission as a composite digital signal through a wireless communication channel comprising the steps of:

a) concurrently measuring a plurality of characteristic values of the analog signal;

b) sample the analog signal to form a digital signal;

c) providing a plurality of sets of encoding parameters, each set corresponding to one of the plurality of characteristic values and;

d) ranking each characteristic value and then selecting one set of the plurality of sets of encoding parameters according to the ranking;

e) associating a corresponding coding value with the selected one set of the plurality of sets of encoding parameters;

f) encoding the digital signal after selecting the selected set of encoding parameters to provide an encoded digital signal; and g) combining the encoded digital signal and the coding value to form the composite digital signal.

14. The method of claim 13 further including decoding, by a telecommunications transceiver, the composite digital signal to provide an analog signal, comprising the steps of:

a) separating the coding value and the encoded digital signal from the composite digital signal;

b) providing a plurality of sets of decoding parameters;

c) selecting one set of the plurality of sets of decoding parameters according to the coding value;

d) decoding the encoded digital signal according to the selected set of decoding parameters; and e) converting the decoded digital signal to the analog signal.

* * * * *